United States Patent [19]
Eriksson

[11] Patent Number: 5,913,458
[45] Date of Patent: Jun. 22, 1999

[54] APPARATUS FOR ADJUSTING THE AXIAL POSITION OF A ROTARY FEEDER

[75] Inventor: Stig Eriksson, Skoghall, Sweden

[73] Assignee: Kvaerner Pulping AB, Sweden

[21] Appl. No.: 08/836,818

[22] PCT Filed: Nov. 9, 1995

[86] PCT No.: PCT/SE95/01326

§ 371 Date: Apr. 24, 1997

§ 102(e) Date: Apr. 24, 1997

[87] PCT Pub. No.: WO96/15398

PCT Pub. Date: May 23, 1996

[30] Foreign Application Priority Data

Nov. 16, 1994 [SE] Sweden ................................. 9403948

[51] Int. Cl.⁶ .............................. F16K 5/08; F16K 25/00
[52] U.S. Cl. ........................................... 222/368; 162/246
[58] Field of Search ............................ 222/368; 162/246, 162/245

[56] References Cited

FOREIGN PATENT DOCUMENTS

0078097 A1  5/1983  European Pat. Off. .

60-151470  8/1985  Japan .

*Primary Examiner*—Dean T. Nguyen
*Attorney, Agent, or Firm*—Fasth Law Offices; Rolf Fasth

[57] ABSTRACT

Apparatus for adjusting the axial position of a rotatable feeder (2) in a charger for sluicing lignocellulose material and, if appropriate, liquid from a first space, with a first pressure, to a second space, with a different pressure, which apparatus (10) comprises an adjustment housing (11) connected immovably to the charger housing and an adjustment shaft (16) which moves the feeder in an axial direction. A worm wheel (23) is arranged on the adjustment shaft, and is coaxial with respect to the same, a shaft for a worm (27) extends through the adjustment housing wall, the worm (27) itself is in engagement with the worm wheel, turning members (29) are arranged to turn the worm and the worm wheel, conversion mechanisms (25, 26) are arranged for converting the rotational movement of the worm wheel, into an axial movement of the adjustment shaft and thus the feeder.

18 Claims, 3 Drawing Sheets

APPARATUS FOR ADJUSTING THE AXIAL POSITION OF A ROTARY FEEDER

TECHNICAL FIELD

The invention relates to an apparatus for adjusting the axial position of a rotatable feeder in a charger housing relative to the charger housing in a charger for sluicing lignocellulose material and, if appropriate, cooking liquid or other treatment fluid from a first space, in which there is a first pressure, to a second space, in which there is a pressure different from the first pressure, which feeder has at least one outer surface of rotation which has the shape of a truncated cone which is intended essentially to bear against a surface of substantially corresponding conical shape in the charger housing, which apparatus comprises an adjustment housing which is connected immovably to the charger housing, an adjustment shaft which is connected to the feeder and is arranged so that it can be displaced in the adjustment housing in order thereby to move the feeder in an axial direction, and also means for executing the axial displacement of the adjustment shaft.

BACKGROUND TO THE INVENTION

In pulp mills, it is necessary to be able to sluice chips or other lignocellulose material, as well as cooking liquids or other treatment fluids, between lines or vessels which have different pressures. Thus, chips are sluiced via a so-called low-pressure feeder into a steaming vessel where a certain steam pressure is maintained, for example about 150 to 200 kPa. After the steaming, the chips and cooking liquid are sluiced via a high-pressure feeder into the high-pressure system of the digester, in which system a considerably higher pressure is maintained. A high-pressure feeder — i.e. a sluice charger intended to be able to operate at high pressure differences — of a conventional type is shown in FIG. 1 and FIG. 2. It consists of a charger housing 1 and a rotor or so-called feeder 2. The latter is divided into a number of compartments 3 for sluicing chips via an inlet opening 4 and cooking liquid through an inlet opening 5 to the pulp digester via an outlet opening 6. The shaft of the feeder is designated by 7. The feeder 2 has the general shape of a truncated cone, the circumferential surface of which is designated by 8. The latter is pressed against a correspondingly shaped surface 9 in the charger housing 1. As a result of the friction between the surfaces 8 and 9 upon rotation of the feeder 2 (the members for executing this rotation are not shown in the figures), the surfaces 8 and 9 become worn. The setting of the feeder 2 therefore has to be gradually adjusted by means of its being displaced axially relative to the charger housing 1. For decades now, various screw arrangements in adjustment apparatuses connected to one end of the feeder shaft 7 have been used for this adjustment. A common feature of these apparatuses is that they required relatively great force for manoeuvring them, and at the same time they provided only limited adjustment precision in many cases. Systems have also been developed for automatically regulating the position of the feeder. For example, Swedish published patent application 9300219-4 describes such an arrangement, but it does not touch upon the abovementioned problems.

BRIEF DESCRIPTION OF THE INVENTION

The object of the invention is to afford improvements to an apparatus of the type mentioned in the introduction. The invention aims in particular to afford an apparatus which does not require great manoeuvring force. Another aim of the invention is to afford an apparatus by means of which the feeder in a charger housing can be adjusted with very great precision. These and other aims can be achieved by virtue of the fact that a worm wheel is arranged on the adjustment shaft, inside the adjustment housing, and is coaxial with respect to the said adjustment shaft, that a shaft for a worm extends through the adjustment housing wall, that the worm is in engagement with the worm wheel in the adjustment housing, that turning members are arranged outside the adjustment housing in order to turn the worm and thus also to turn the worm wheel, and that means are arranged for converting the rotational movement of the worm wheel, as generated by the worm, into an axial movement of the adjustment shaft and thus an axial movement of the feeder in the charger housing.

The said means for converting the rotational movement of the worm wheel, as generated by the worm, into an axial movement of the adjustment shaft preferably consist of threads on the inside of the worm wheel or on a tubular part alongside the worm wheel and connected to the worm wheel, and of corresponding threads on the adjustment shaft in engagement with the worm wheel or corresponding threads. The worm wheel, or the unit in which the worm wheel is included as a part, is in other words designed as a nut, while the adjustment shaft is designed as a non-rotatable screw cooperating with this nut.

By means of the apparatus according to the invention, considerably less torque is required than in the case of known apparatuses for adjustment of the feeder. The said turning members outside the adjustment housing for turning the worm can therefore be made comparatively small. For example, the said turning members can be intended for manual activation, for example a wheel, which can have a comparatively small radial extent and yet be easy to work with. Instead of manual manoeuvring members, it is of course possible to use motors, for example an electric motor or hydraulic motor, and a particular advantage of the invention is that these can be comparatively small.

Locking members are also preferably provided, by means of which it is possible to fix the adjustment shaft in the desired positions. These locking members can include at least one first element on the rotatable unit which includes the worm wheel, and a second element which extends through the adjustment housing wall and can be moved into and out of engagement with the first locking element. Furthermore, the worm wheel is preferably mounted in a bearing housing part in the adjustment housing, while the said first locking element is arranged in a part of the adjustment housing other than the bearing housing part. This makes it possible for the said first locking element to be designed as a toothed disc with a considerably greater diameter than the worm wheel, which, in combination with the two-stage gear reduction of the movement of the adjustment shaft via worm gear and screw threads, affords good possibilities for fine adjustment of the feeder. However, it is also possible to use the worm wheel itself as first locking element, instead of a separate, toothed disc. In this case, the worm wheel can be provided with a circumferential toothing alongside the worm wheel thread. It is also conceivable to give this part of the worm wheel a considerably greater diameter than the threaded part of the worm wheel in order thereby to achieve the same possibility of fine adjustment as with a separate toothed disc of great diameter, which can accommodate a considerably larger number of teeth than a locking element of smaller diameter.

Further aspects and characteristics of the invention will be clear from the patent claims and from the following description of an embodiment.

BRIEF DESCRIPTION OF THE FIGURES

A preferred embodiment of the invention will be described in more detail hereinbelow with reference to the attached figures, in which.

DESCRIPTION OF PREFERRED EMBODIMENT

Figure 1:
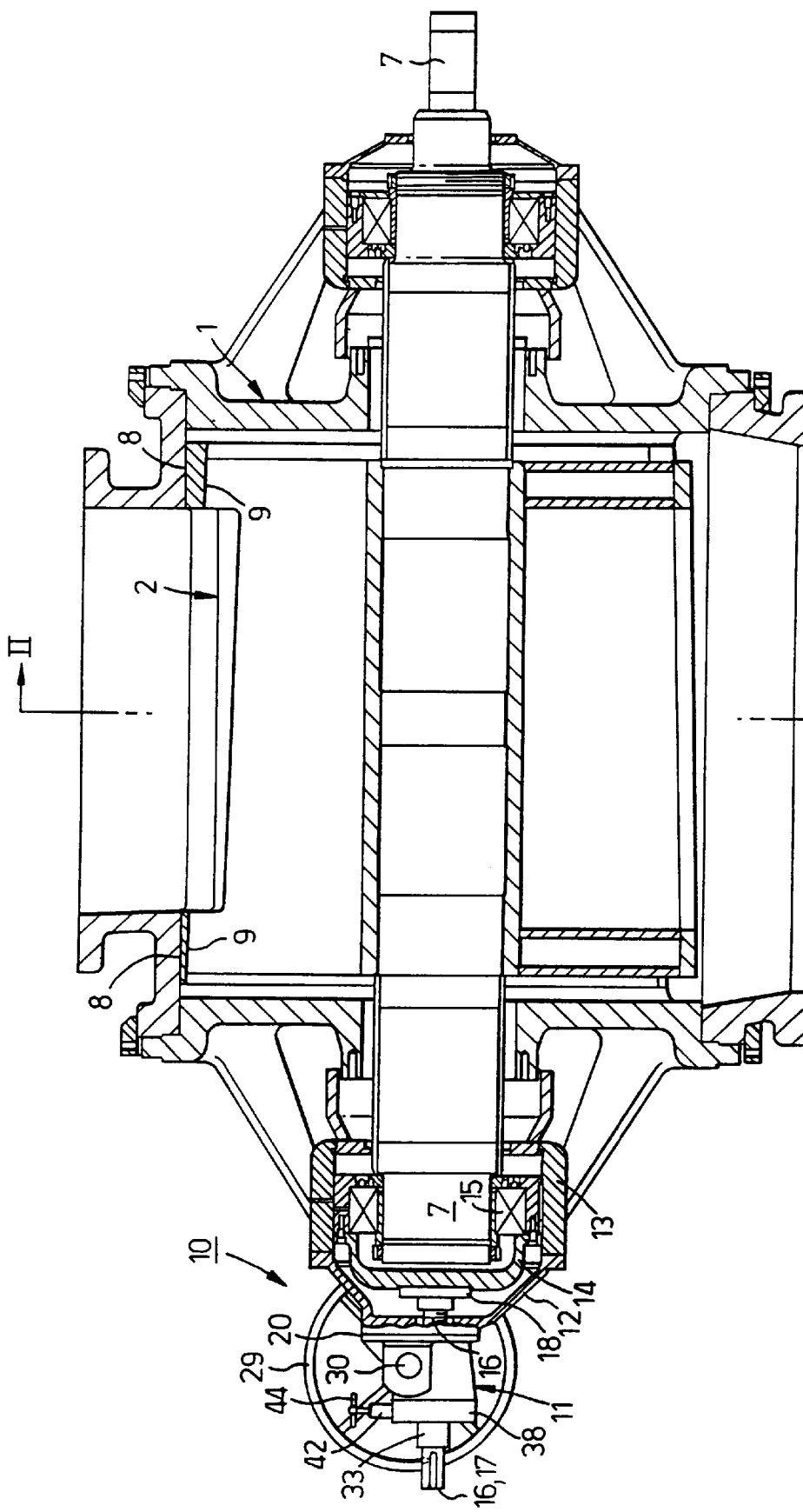
FIG. 1 represents an axial cross-section through a sluice charger in which use is made of an adjustment apparatus according to the invention, as seen in the left-hand part of the figure.
Figure 2:
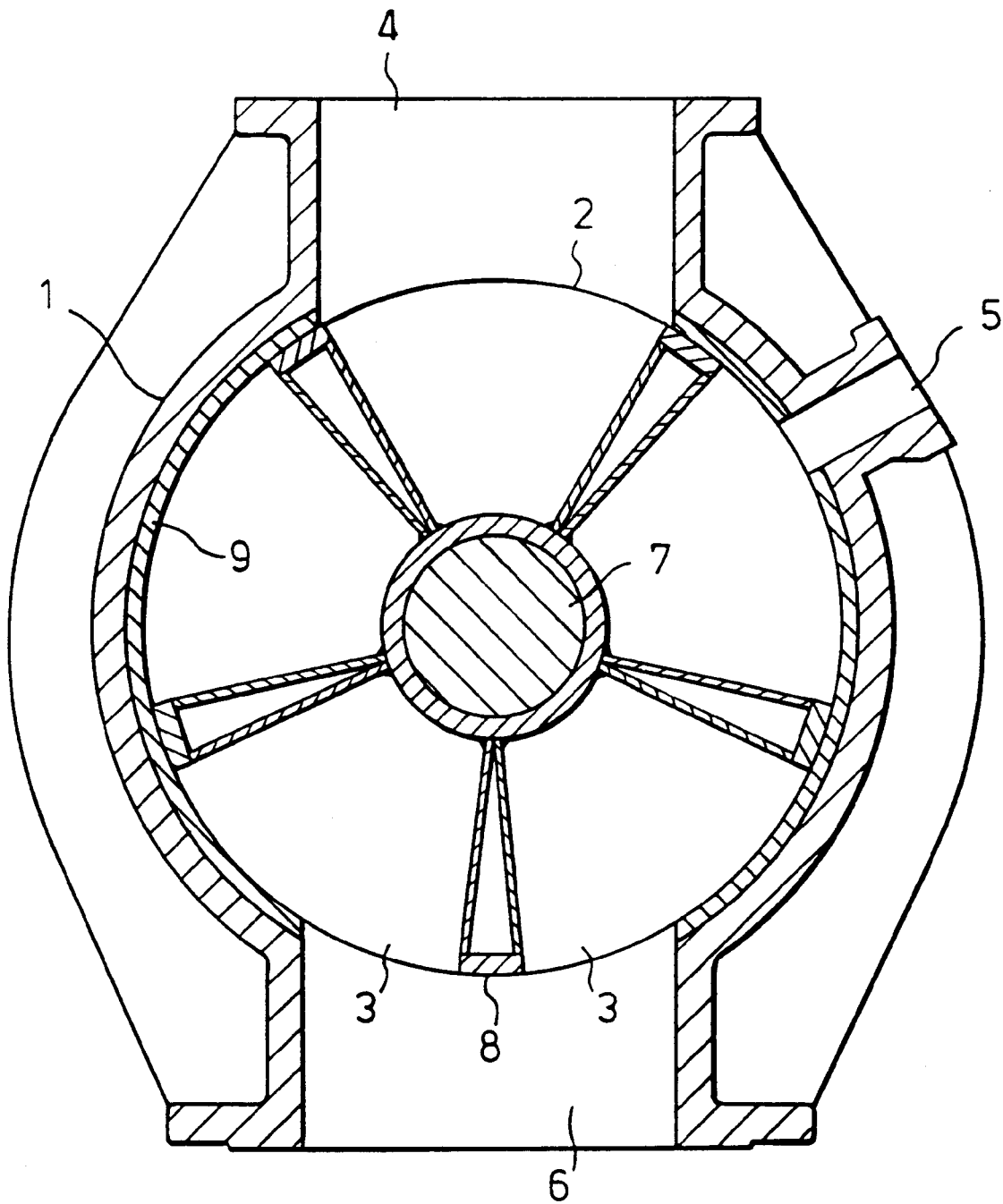
FIG. 2 represents a cross-section along II—II in FIG. 1.
Figure 3:
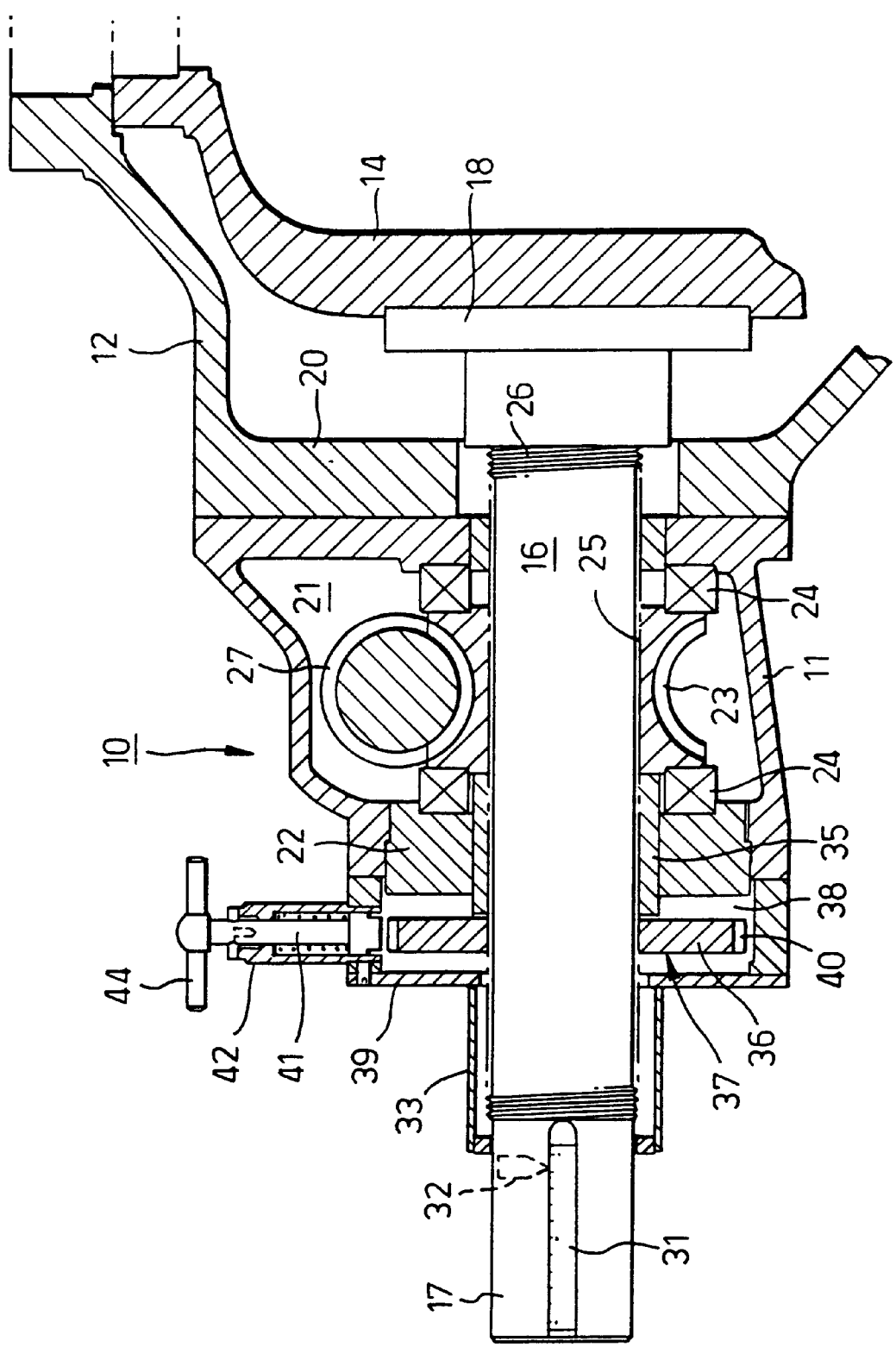
FIG. 3 shows, on a larger scale, an axial cross-section through the apparatus according to the invention.

An apparatus according to the invention has been designated generally by 10 in FIG. 1 and FIG. 3. The apparatus 10 comprises an adjustment housing 11 which is connected immovably, via an attachment casing 12, to an end portion 13 of the charger housing 1. In the end portion 13 there is a bearing housing 14 with bearings 15 for the feeder shaft 7. The bearing housing 14 can move slidably, but not rotatably, in the end portion 13.

An adjustment shaft is designated by 16. This has an end portion 17 outside the adjustment housing 11 and extends through the adjustment housing 11 and through the attachment casing 12. The inner end of the adjustment shaft 16 is connected via an attachment plate 18 to the non-rotatable bearing housing 14, as a result of which the adjustment shaft 16 is prevented from turning.

The adjustment housing 11 is delimited inwardly by a flanged end wall 20 which is joined to the attachment casing 12 by screw connection, and a bearing housing part 21 in the adjustment housing 11 is delimited inwardly by the said end wall 20 and by a strong partition wall 22. In the bearing housing part 21, a worm wheel 23 is arranged around the adjustment shaft 16, mounted in the bearing housing part 21 via bearings 24. In accordance with the embodiment, the worm wheel 23 is designed as a nut. The nut threads are designated by 25. The adjustment screw 16 has corresponding threads 26 in engagement with the threads 25 in the worm wheel 23. A worm 27 is in engagement with the worm wheel 23.

The shaft of the worm 27 extends in one direction out through the wall of the adjustment housing 11 and is provided at the end with a wheel 29, FIG. 1. An axle journal 30 at the other end of the worm 27 is mounted in the adjustment housing wall on the other side of the adjustment housing.

The protruding part 17 of the adjustment shaft 16 is provided with a scale 31 which can be read off against an indicator 32 (shown diagrammatically) on an extension 33 of the adjustment housing 11.

By virtue of the fact that the adjustment shaft 16 is connected in a fixed manner to the non-rotatable bearing housing 14 via the attachment plate 18, no further members are required, for example splines or the like, to prevent the screw-like adjustment shaft 16 rotating in the adjustment housing 11.

A sleeve 35 extends rotatably through the partition wall 22 and forms a connection between the worm wheel 23 and a safety nut 36. The worm wheel 23, the connecting sleeve 35 and the safety nut 36 thus form a continuous unit, generally designated by 37. The safety nut 36 too is preferably threaded internally, cooperating with the threads 26 on the adjustment shaft 16.

The safety nut 36 is arranged in a lock housing 38 which constitutes a part of the adjustment housing 11 between the partition wall 22 and an end wall 39. The safety nut 36 has a greater external diameter than the worm wheel 23 and has notches 40 on the outside. A locking pin 41 is arranged in a casing 42 in a manner known per se and extends radially out from the circumferential wall of the lock housing 38. A locking catch 43 at the end of the locking pin 41 can be brought into and out of engagement with the notches 40 on the safety nut 36 with the aid of the pin 41, which can be screwed into and out of engagement with the notches 40 with the aid of a handle 44.

The arrangement thus described functions in the following way. When the surfaces 8, 9 (FIG. 1) have become worn to a certain extent, and the feeder 2 is to be adjusted in relation to the charger housing 1, the catch 43 is released from engagement with the notches 40 on the safety nut 36. When the safety nut 36 is thus uncoupled, the worm 27 is turned with the aid of the wheel 29. The rotational movement of the worm 27 is transmitted to the worm wheel 23 which is turned about the adjustment shaft 16, mounted in the bearings 24 in the bearing housing part 21. At the same time, the safety nut 36 is also turned via the connecting sleeve 35. As a result of engagement between the threads 25 on the rotating worm wheel 23 and the threads 26 on the non-rotatable screw/adjustment shaft 16, the adjustment shaft 16 is in this case forced to move axially. The axial movement of the adjustment shaft 16 is transmitted via the plate 18 to the non-rotatable bearing housing 14 and from the bearing housing via the bearings 15 to the feeder shaft 7 and thus to the feeder 2. The movement is extremely slow on account of the gear reduction, first between the worm 27 and the worm wheel 23, and thereafter between the worm wheel 23 and the screw/adjustment shaft 16. Very little force is therefore needed to displace the adjustment shaft 16 and with it the whole feeder 2 in the axial direction. At the same time, this also affords the possibility of adjusting the position of the shaft 16 and thus of the feeder 2 with great precision by reading off the scale 31 against the indicator 32. When the desired position has been reached, the shaft 16 and with it the feeder 2 are fixed with the aid of the locking catch 43 which, with the aid of the handle 44, is screwed into the locking position against the safety nut 36, provided with notches 40, in the lock housing 38.

While the present invention has been described in accordance with preferred compositions and embodiments, it is to be understood that certain substitutions and alterations may be made thereto without departing from the spirit and scope of the following claims.

I claim:

1. An apparatus for adjusting an axial position of a rotatable feeder, comprising:

a rotatable feeder for sluicing a lignocellulose material from a first space defined a charger housing to a second space defined in the charger housing, the first space having a first pressure and the second space having a second pressure, the first pressure being different from the second pressure;

the charger housing being in operative engagement with the rotatable feeder disposed within the charger housing, an axial position of the rotatable feeder being adjustable relative to the charger housing, the rotatable feeder having an outer rotatable surface, the outer rotatable surface having a shape of a truncated cone, the charger housing having a conical shaped inner surface that is adapted to bear against the outer rotatable surface of the rotatable feeder;

an adjustment housing secured to the charger housing, the adjustment housing having a wall;

an adjustment shaft connected to the rotatable feeder, the adjustment shaft being axially movable within the adjustment housing to axially shift the rotatable feeder;

a worm wheel disposed inside the adjustment housing and in operative engagement with the adjustment shaft, the worm wheel being coaxially aligned with the adjustment shaft;

a worm having a shaft extending through the wall of the adjustment housing, the worm being in operative engagement with the worm wheel;

a turning member disposed outside the adjustment housing and in operative engagement with the worm wheel, the turning member providing rotational movement of the worm wheel; and a conversion mechanism in operative engagement with the worm wheel for converting rotational movement of the worm wheel into an axial movement of the adjustment shaft and the rotatable feeder connected thereto.

2. The apparatus according to claim 1 wherein the apparatus comprises a nut element that is in operative engagement with the worm wheel and the adjustment shaft comprises a threaded screw portion that is adapted to cooperate with the nut element.

3. The apparatus according to claim 1 wherein the apparatus comprises a locking member that is adapted to lock the adjustment shaft in a locked position relative to the adjustment housing.

4. The apparatus according to claim 3 wherein the locking member comprises a first locking element disposed on a rotatable unit, the rotatable unit comprises the worm wheel and a second element that extends through the adjustment housing wall, the second element is movable into and out of operative engagement with the first locking element.

5. The apparatus according to claim 4 wherein the worm wheel is mounted inside a bearing housing disposed in the adjustment housing.

6. The apparatus according to claim 5 wherein the first locking element is disposed inside a locking housing that is separate from the bearing housing.

7. The apparatus according to claim 6 wherein the first locking element is disposed inside the locking housing and the first locking element is a toothed disc having a diameter that is greater than a diameter of the worm wheel.

8. The apparatus according to claim 4 wherein the first locking element comprises a portion of the worm wheel, the portion has a toothed section and a diameter that is greater than a diameter of a threaded part of the worm wheel.

9. The apparatus according to claim 1 wherein the apparatus comprises a locking device for preventing rotational movement of the adjustment shaft.

10. The apparatus according to claim 1 wherein the adjustable shaft is secured to the bearing housing and one end of a shaft of the rotatable feeder is attached to the bearing housing, the bearing housing is axially shiftable relative to the charger housing.

11. The apparatus according to claim 1 wherein the turning member is a wheel having a diameter that is substantially smaller than a maximum inner diameter of the rotatable feeder, the turning member is adapted to be turned manually.

12. The apparatus according to claim 11 wherein the diameter of the wheel is less than about ⅔ of the maximum inner diameter of the rotatable feeder.

13. The apparatus according to claim 11 wherein the diameter of the wheel is less than ½ of the maximum inner diameter of the rotatable feeder.

14. The apparatus according to claim 1 wherein the worm comprises an axle journal attached thereto.

15. The apparatus according to claim 1 wherein the apparatus comprises a drive unit adapted to drive the worm.

16. The apparatus according to claim 15 wherein the drive unit is an electric motor.

17. The apparatus according to claim 15 wherein the drive unit is a hydraulic motor.

18. An apparatus for adjusting an axial position of a rotatable feeder, comprising:

a rotatable feeder for sluicing a lignocellulose material from a first space defined a charger housing to a second space defined in the charger housing, the first space having a first pressure and the second space having a second pressure, the first pressure being different from the second pressure;

the charger housing being in operative engagement with the rotatable feeder disposed within the charger housing, an axial position of the rotatable feeder being adjustable relative to the charger housing, the rotatable feeder having an outer rotatable surface, the outer rotatable surface having a shape of a truncated cone, the charger housing having a conical shaped inner surface that is adapted to bear against the outer rotatable surface of the rotatable feeder;

an adjustment housing secured to the charger housing, the adjustment housing having a wall;

an adjustment shaft connected to the rotatable feeder, the adjustment shaft being axially movable within the adjustment housing to axially shift the rotatable feeder, the adjustment shaft having a threaded portion;

a worm wheel disposed inside the adjustment housing and in operative engagement with the adjustment shaft, the worm wheel being coaxially aligned with the adjustment shaft, the worm wheel having a threaded section that is adapted to cooperate with the threaded portion of the adjustment shaft so that when the worm wheel is rotationally shifted, the adjustment shaft is axially shifted, the worm wheel having a diameter;

a worm having a shaft extending through the wall of the adjustment housing, the worm being in operative engagement with the worm wheel;

a wheel-shaped turning member disposed outside the adjustment housing and in operative engagement with the worm wheel, the turning member providing rotational movement of the worm wheel, the turning member having an outer diameter that is substantially smaller than a maximum inner diameter of the rotatable feeder;

a conversion mechanism in operative engagement with the worm wheel for converting rotational movement of the worm wheel into an axial movement of the adjustment shaft and the rotatable feeder connected thereto;

a locking member in operative engagement with the adjustment shaft and adapted to lock the adjustment shaft in a locked position relative to the adjustment housing, the locking member comprises a toothed disc having a diameter that is greater than the diameter of the worm wheel; and a drive unit in operative engagement with the worm wheel and adapted to drive the worm wheel.

* * * * *